United States Patent [19]

Roach et al.

[11] Patent Number: 4,838,477

[45] Date of Patent: Jun. 13, 1989

[54] METHOD OF WELDING FLANGED PIPE SECTIONS AND APPARATUS THEREFOR

[75] Inventors: Max J. Roach, Longview, Tex.; Jack C. Taylor, Mississauga, Canada

[73] Assignee: Du Pont Canada Inc., Mississauga, Canada

[21] Appl. No.: 193,758

[22] Filed: May 13, 1988

[51] Int. Cl.[4] .................... B23K 31/02; B23K 35/38
[52] U.S. Cl. .................................. 228/222; 228/46; 228/200; 228/219; 285/21; 285/41; 285/363
[58] Field of Search ............... 228/46, 222, 200, 219; 285/21, 41, 363

[56] References Cited

U.S. PATENT DOCUMENTS

| | | | |
|---|---|---|---|
| 4,277,013 | 7/1981 | Spanoudis | 228/136 |
| 4,296,300 | 10/1981 | Bottiglia | 228/46 |
| 4,556,162 | 12/1985 | Gwin et al. | 228/50 |

FOREIGN PATENT DOCUMENTS

| | | | |
|---|---|---|---|
| 1026432 | 9/1987 | Canada | 327/73 |
| 1093866 | 9/1987 | Canada | 78/40 |

Primary Examiner—Nicholas P. Godici
Assistant Examiner—Michael William Starkweather

[57] ABSTRACT

A method for joining together a pair of flanged metal pipe sections at their respective flanges. The sections have heat sensitive material juxtaposed to, in contact with or bonded to the interior thereof. The method includes the step of providing coolant passages, each of the passages being located adjacent to respect of one of the flanges in proximity to the heat sensitive material for heat exchange therewith. The flanges are brought into a welding position and coolant is passed through the passages. The flanges are then welded together and coolant is continuously passed through the passages until the resultant welded flanges have cooled. An apparatus for effecting this method is also provided comprising a coolant passage adjacent to the flange and in heat exchange relationship with the flange. The coolant passage has an inlet for introducing coolant and an outlet for exhausting coolant therefrom.

32 Claims, 6 Drawing Sheets

METHOD OF WELDING FLANGED PIPE SECTIONS AND APPARATUS THEREFOR

This invention relates to a method for the welding together of flanged pipe sections having heat-sensitive material on the internal walls thereof.

As used herein, heat-sensitive materials include linings and coatings formed from heat-sensitive materials or composition e.g. thermoplastic and thermoset polymers, and the like, that exhibit short-term or long-term deleterious effects as a result of exposure to heat.

In the installation of undergound pipelines, which are intended to carry oil-based, aqueous or other materials, it is common practice to butt-weld the joints bwtween setions of pipe in order to provide maximum resistance to leakage and maximum strength of the finished pipeline. However, when such pipelines are lined or coated e.g. with heat-sensitive corrosion-resistant materials, either at the time of installation or after a period of service, it is common practice of fix flanges at the joints bwteen sections, the flanges being bolted together, with or without gaskets of various designs, to provide a unitary pipeline. Such butt-welding and bolting of flanges is normally carried out in the field i.e. at the location of the installation of the pipeline. Whilst many flange designs are reliable, there remains a need in the pipeline industry for a method to join pipe sections lined or coated with polymeric or other heat sensitive materials to provide the long-term integrity of the resultant joints that has been historically associated with butt-welded joints.

U.S. Pat. No. 4,227,013 to L. Spanoudis, issued 1981 July 07, discloses a method for braze-assembling metal components which includes the use of heat sinks conforming to the dimensions of portions of the components to stabilize them and prevent softening of the metal components at regions other than those to be brazed.

Canadian Pat. No. 1,026,432 to K. Usui et al, issued 1978 Feb. 14, discloses a method for joining thermoplastic-laminated metal tapes by electric resistance welding in which melting of the thermoplastic laminations is avoided by the use of extremely rapid heating and cooling combined with the heat sink effect of a larg press block, which may optionally be water-cooled.

U.S. Pat. No. 4,556,162 to R. B. Gwin et al. issued Dec. 03, 1985 discloses a weld backup system for welding a join between pipe section which includes a segmented ring that is moved into registration at the joint between two pipe sections in order to keep the pipe sections in alignment during the welding operation. The backup system provides sufficient heat sink for the weld puddle to properly solidify, but does not employ liquid cooling.

Canadian Pat. No. 1,093,866 to M. S. Sloan et al, issued Jan. 20, 1981 discloses a device to be used in the butt welding of piping for nuclear systems that is capable of both purging and heat sinking in the weld zone. The device is used internally of the pipe sections and includes inflatable bladders to seal off a fluid-carrying zone adjacent to the weld area. Purging or heat removal fluids are transferred into and out of the fluid-carrying zone as required.

Notwithstanding the above-mentioned disclosures, there remains a need for a method to weld pipe sections that have been fitted with flanges and have heat-sensitive material therein. It has now been found that the welding of such pipe sections may be accomplished by using a heat sink device associated with the flange of a pipe section and provided with a cooling fluid which acts as a heat transfer medium.

Accordingly, the invention provides a method for joining together a pair of flanged pipe sections at their respective flanges, said sections having heat sensitive material juxtaposed to, in contact with or bonded to the internal walls thereof, said method comprising the steps of:

(a) providing coolant passages, each of said passages being located adjacent to a respective one of said flanges for heat transfer therewith;

(b) bringing said flanges into a welding position and passing coolant through said passages;

(c) welding together said flanges; and (d) continuing to pass coolant through said passages until the resultant welded flanges have cooled.

The invention further provides a pipe assembly comprising:

(a) a pipe section having a heat sensitive material juxtaposed to, in contact with or bonded to the interior thereof and having a flange on an end thereof; and (b) a coolant passage located adjacent to said flange in heat exchange relationship with said flange, said coolant passage having an inlet for introducing coolant therein and an outlet for exhausting coolant therefrom.

The invention also provides a flange for use in a flange-type joint of a pipe section, said pipe section having a heat-sensitive material juxtaposed to, in contact with or bonded to the internal walls thereof, said flange comprising:

(a) a flange portion; and (b) a coolant passage locatable in heat exchange relationship with said flange portion, said coolant passage having an inlet for introducing coolant therein and an outlet for exhausting coolant therefrom.

In drawings illustrating preferred embodiments of the invention:

Figure 1:
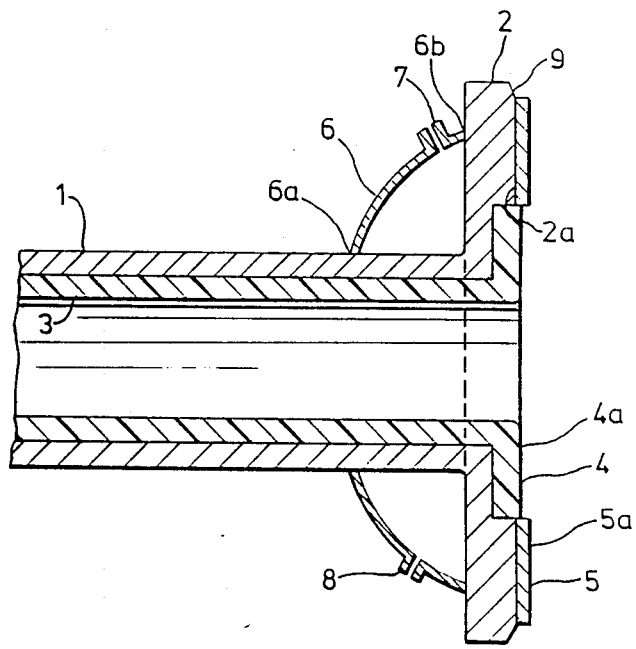
FIG. 1 is a sectional view of a flanged pipe having a coolant passage permanently mounted thereon.

The various embodiments of this invention disclosed herein teach several ways of providing a coolant passage capable of removing sufficient heat from the region of the flange remote from the weld bead in a way that any polymeric liner present is not damaged by the heat of welding. The embodiments all have the common feature that cooling fluid or heat sink material is located in heat exchange relation with the flange. The fluid passage extends at least to a region closer to the weld zone than the greatest extend of the heat-sensitive material, in order to maintain the temperature of the flange region immediately adjacent to the heat-sensitive material at a temperature which tends not to cause damage to the material.

In selecting a coolant to be used in the method of the invention, consideration is given to many factors, for example the thickness of the pipe and of the flange, the thickness of the desired weld bead, the maximum temperature to which the heat sensitive material can be exposed, and the distance between the weld zone and the nearest extremity of the heat-sensitive material. In many applications in the pipeline industry, a polyethylene liner is used; because some grades of polyethylene tend to lose their plastic memory at temperatures above about 110°-120° C., it is preferable to provide a maximum temperature of 100° C. or less at the extremity of the liner. The cooling fluid may be water, chilled water or other suitable heat transfer fluids, for example, water-ethylene glycol mixtures, chlorofluorocarbons or cryogenic or liquified gases, as will be understood by persons skilled in the art.

The rate of flow of the coolant is selected to achieve the desired temperature range at the extremity of the liner. The coolant passage may be located in heat exchange relation with the flange either permanently or temporarily. If permanent, the heat transfer zone may be defined by a collar fastened either on the rear or perimeter surface of the flange and/or on both the flange and a portion of the pipe by a method known in the art, for example welding or brazing. If temporary, the heat transfer zone may be defined by a removable collar fastened temporarily to the rear or perimeter surface of the flange and/or both the flange and a portion of the pipe, by means known in the art, for example, bands and/or clamps. Although loss of the cooling fluid may be of minor importance if the cooling fluid is water, it is advantageous although not necessary for the clamping surface of the removable collar which comes in contact with the surfaces of the flange or pipe to be fitted with a resilient gasket in order to provide an effective fluid seal between the removable collar and the surfaces of the flange and/or pipe.

Because a temporary removable collar must be removed from the surfaces of the flange and/or pipe after welding the joint in the pipeline, the removable collar is preferably made from a plurality of pieces, preferably two pieces, which may be removably fastened together prior to the welding operation, for example, by clamping. Alternatively, the passage may be formed within the flange itself. The passage walls may be defined by recesses located in either the rear or front walls of the flanges. When defined by the rear wall, a cover having an inlet and outlet therein is preferably either temporarily or permanently mounted over the recess. When defined by the front wall, the passage faces a passage of a second flange when in the welding position to provide a single chamber.

The collar of the invention is made of a material capable of withstanding the forces encountered during the attachment of the collar to the surfaces of the flange and/or pipe and the temperatures encountered during the welding operation, and may be made of mild steel, stainless steel or other suitable metallic or non-metallic materials. The cover is preferably made with the same type of material as the collar. The collar may be permanently attached to the pipe, by slipping it over the end of the pipe prior to the installation of the flange, and fastening in place prior to installing the flange. Alternatively, a stub-end may be provided, which includes a flange and collar fastened in place with or without a short section of pipe, which is preferably of the same diameter and thickness as the pipe to be joined and of a material compatible therewith.

Referring to FIG. 1, pipe section 1 is fitted with a flange 2 which has a chamfer 9 in which the weld metal is to be deposited when flange 2 is in registration with a mating flange on another pipe section (not shown). Pipe liner 3 extends around the end of pipe section 1 and into the liner flange zone 4 in order to provide a continuous liner surface with the finished pipeline when mated with an adjoining lined pipe section. The surface of the liner in liner flange zone 4 usually, though not necessarily, protrudes slightly beyond the face 2a of flange 2. Gasket 5, which is made of heat-resistant material, for example, asbestos, is annular in shape and its outer surface provides a base for the weld puddle to be introduced into the weld zone defined by chamfer 9. Advantageously, the outer surface 5a of gasket 5 protrudes beyond the surface 4a of liner flange zone 4; if it does it may then mate with the liner flange zone on a adjoining pipe section in order to maintain the two sections in registration during the welding operation, acting as a spacer. Collar 6 is fastened to pipe section 1 and flange 2 at collar weld zones 6a and 6b respectively, which may be formed by welding using a suitable weld metal. Orifices 7 and 8 permit the ingress and egress of cooling fluid; optionally, the flow of cooling fluid may be reversed during the welding operation to ensure that the maximum cooling is available at the zone nearest to the point where the weld is being applied at any time during the welding operation. Under severe cooling conditions, it may be advantageous to provide a plurality of orifices for the ingress and egress of cooling fluid. Alternatively, the chamber may be designed such that the fluid may be directed continuously along a predetermined flow path.

Figure 2:
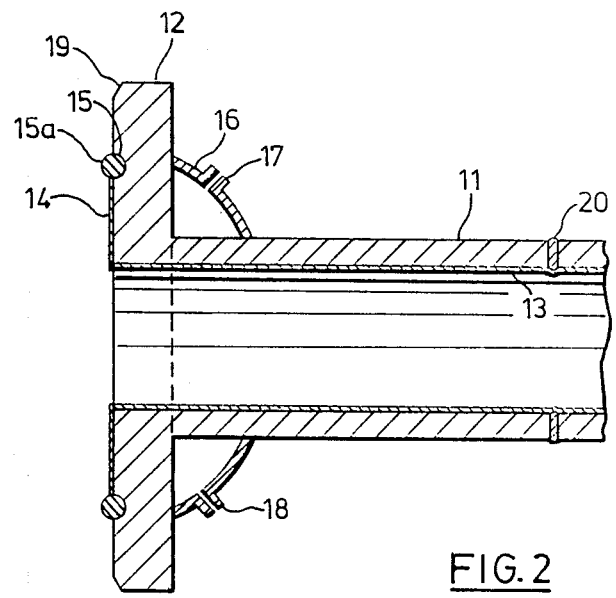
FIG. 2 is a sectional view of a flanged stub end for a pipe, having a coolant passage permanently mounted thereon.

Referring to FIG. 2, an apparatus including a stub end is shown, which may be attached to an existing pipe prior to installing a heat-sensitive material, for example by welding at stub weld bead 20. Short pipe section 11 is fitted with flange 12 having chamfer 19 and collar 16 with orifices 17 and 18 similar to those illustrated by FIG. 1. Heat-sensitive material 13 is a coating, which may be applied by coating methods known in the art, for example spraying, and a continuous coating surface extends onto the face of flange 12 at coating flange zone 14 in order to provide a continuous coating surface in the finished pipeline. In preparation for welding the pipeline sections together, sealing ring 15a, which is made of a suitable material, for example stainless steel, is inserted into recess 15. The flange on the adjacent pipe section (not shown) has a mating recess which accepts sealing ring 15a when it is in registration with flange 12. The mating flanges are temporarily fastened together, for example by clamping, the flow of cooling fluid is started and the weld metal is deposited in the weld zone defined by chamfer 19 in a known manner. After the weld is complete, the flow of cooling fluid is stopped and the temporary fastening means removed.

Figure 3:
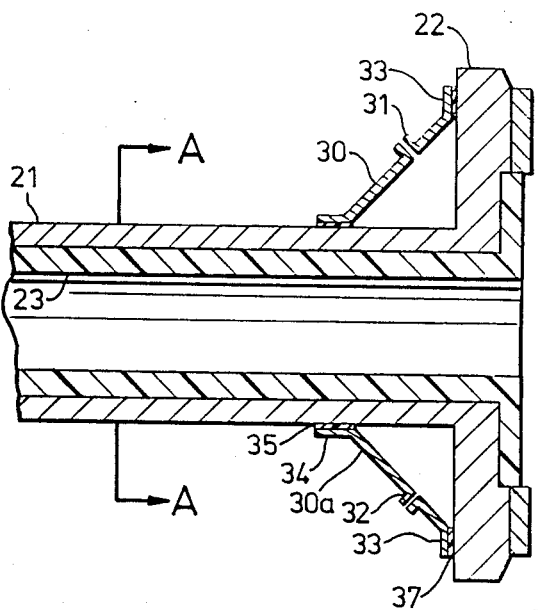
FIG. 3 is a sectional view of a flanged pipe showing a coolant passage removably attached thereto.

Referring now to FIG. 3, pipe section 21 is fitted with flange 22 and liner 23 in a manner similar to the embodiment shown in FIG. 1. Temporary collar 30 fitted with orifices 31 and 32 has collar-flange mating surface zone 33 which is preferably in contact with the rear or perimeter surface of flange 22.

Collar-pipe mating zone 34 is adapted to mate with pipe section 21. Preferably, to prevent spillage of cooling fluid, resilient sealing gaskets 35 and 37 are affixed to the surface of mating zones 33 and 34, which come in contact with the flange and the pipe section, by known methods of fastening, for example heat-resistant adhesive or clamping.

Figure 4:
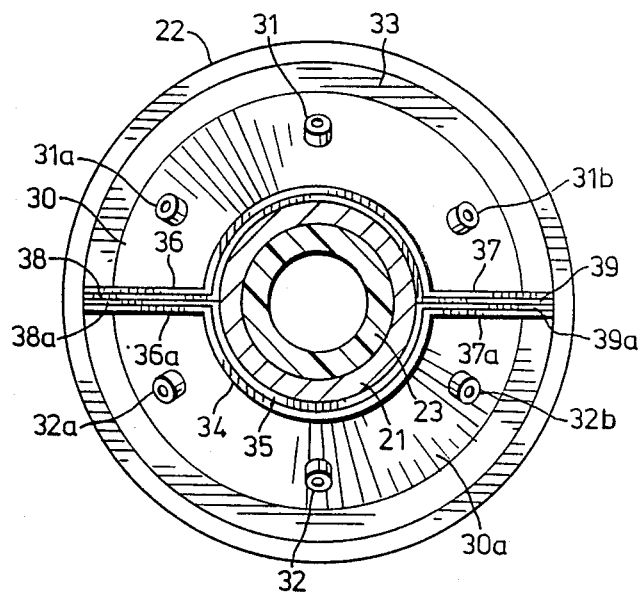
FIG. 4 is a partially sectional view of the removable coolant passage of FIG. 3, taken through A—A.

In the end view of one embodiment of a temporary, removable collar shown in FIG. 4, upper collar section 30 and lower collar section 30a contain multiple orifices 31, 31a and 31b, and 32, 32a and 32b respectively. Pipe section 21 lined with liner 23 has a flange 22. Collar-flange mating zone 33 describes an annulus at the periphery of upper collar portion 30 and lower collar portion 30a which is capable of being clamped against the rear surface of flange 22. Collar-pipe mating zone 34 having collar-pipe gasket 35 has a diameter to mate with the outer surface of pipe section 21. Upper collar portion 30 and lower collar portion 30a mate with each other at collar-collar mating zones 36, 36a and 37, 37a having gaskets 38, 38a and 39, 39a respectively. The collar-collar mating zones are temporarily fastened together during the welding operation, for example by clamping, which may be accomplished by, for example, integral or removable screw clamps. If collar-pipe mating zones 34, 34a are tightly fitted against pipe section 21, little if any leakage of cooling fluid will occur, even though no clamping force is directly applied to collar-pipe mating zone 34. Optionally, a perimeter clamp may be applied to collar-pipe mating zone 34 to fasten it tightly against pipe section 21.

Figure 5:
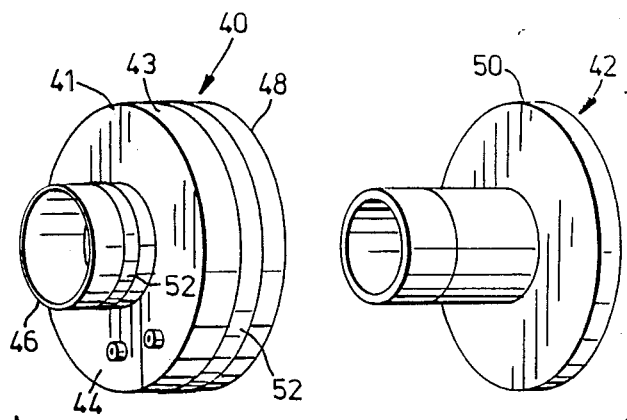
FIG. 5 is an exploded perspective view of a flanged pipe with an alternative embodiment of a coolant passage.

In FIG. 5, a collar 40 of an alternative embodiment is shown prior to being fitted onto a stub pipe 42. This collar has a generally cylindrical portion 43 with a face plate 44 mounted on one end 41 thereof. This face plate 44 has an orifice 45 corresponding in diameter to the diameter of the pipe stub 42. A projecting rim 46 extends around the circumference of this orifice 45. The orifice 45 is slipped over the pipe stub and the other end 48 is fitted over the outer perimeter 50 of the flange 42 to mount the collar onto the stub. To secure the collar, clamped bands 52 are provided around the rim 46 and the end 48 of the collar.

Figure 6:
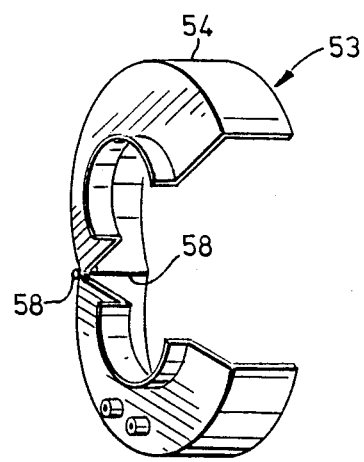
FIG. 6 is a perspective view of a removable collar.

FIG. 6 depicts a collar 53 similar to that shown in FIG. 5 except that the cylindrical portion 54 is in two parts connected together at one of their ends 56 by a hinge 58. Instead of being slipped over the pipe stub, the collar is fitted around the stub and held in place by clamped bands.

Figure 7:
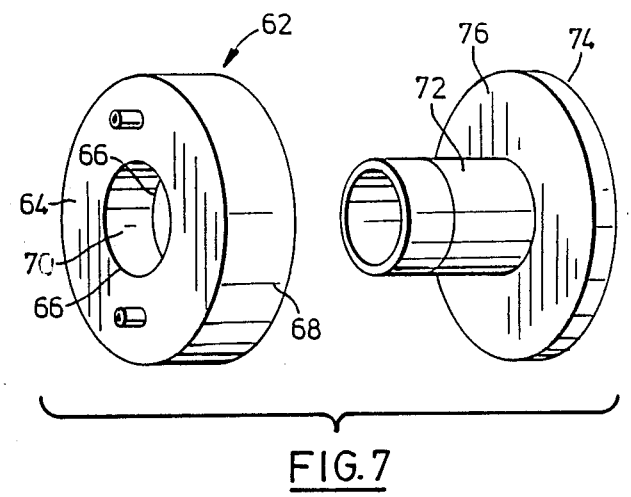
FIG. 7 is an exploded perspective view of a flanged pipe with another alternative embodiment of a coolant passage.

Another embodiment is shown in FIG. 7. This embodiment employs a coolant passage defined by a unitary container 62. This container 62 comprises a pair of plates 64 having aligned holes 66 therein. These plates 64 are spaced apart by an outer cylindrical conduit 68 attached to the outer peripheries of the plates 64 and by an inner cylindrical conduit 70 attached to the peripheries of the holes 66. To mount this container onto the pipe stub 72, the inner conduit 70 is slipped over the pipe stub 72 and located adjacent to the flange 74. Heat transfer cement is applied either to the rear wall 76 of the flange or to the plate 64 facing the flange to provide close contact between this plate and the flange. This embodiment is suitable for use in situations where there is a concern that the coolant will corrode the flange and pipe stub.

Figure 8:
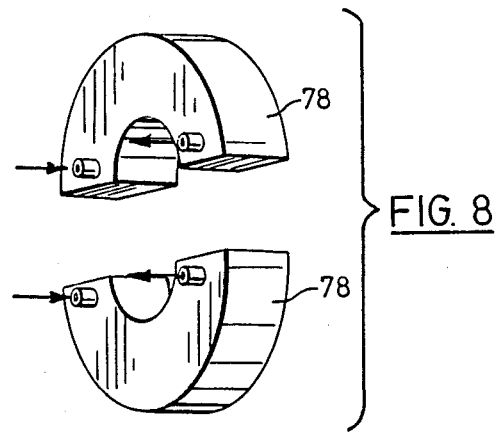
FIG. 8 is a perspective view of a still further alternative embodiment of a coolant passage.

FIG. 8 shows an embodiment similar to that shown in FIG. 7 except that two semi-circular containers 78 are employed, which can be fitted around the pipe instead of being slipped over the pipe. These can be held together after fitting by clamped bands.

Figure 9:
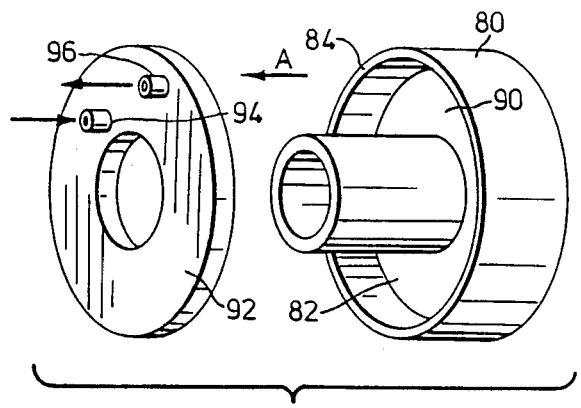
FIG. 9 is an exploded perspective view of a flanged pipe with another alternative embodiment of a coolant passage.
Figure 10:
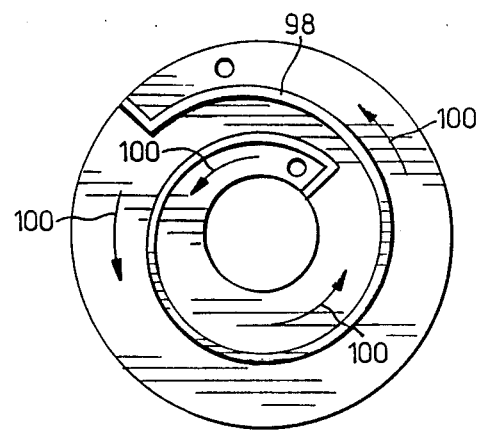
FIG. 10 is a view in the direction of arrow A in FIG. 9.

FIG. 9 illustrates an embodiment wherein the coolant passage is located within the flange. The flange 80 has a recess 82 in the rear wall 84 thereof which defines the passage 90. A cover plate 92 is provided to seal the passage 90. This cover plate is provided with an inlet 94 and an outlet 96 for introduction and withdrawal of coolant respectively. FIG. 10 is a view in the direction of the arrow A in FIG. 9 showing the reverse side of the plate. It can be seen that this side of the plate 92 is provided with baffles 98 to direct flow of the coolant along a circuitous path, as illustrated by the arrows 100. To assemble this embodiment, the cover is laid over the recess 82 and is fastened by welding or other suitable means.

Figure 11:
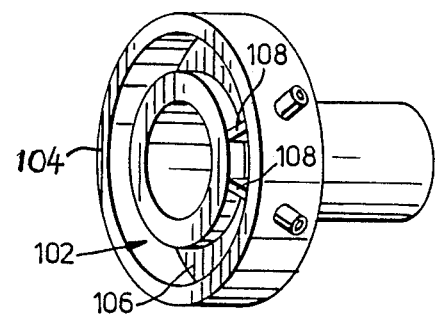
FIG. 11 is a perspective view of a flanged pipe having a coolant passage located within the flange thereof.
Figure 12:
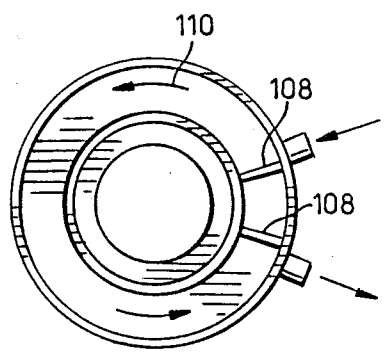
FIG. 12 is a front view of the flange of FIG. 11.

FIGS. 11 and 12 also depict an embodiment wherein the passage is located within the flange, however, in this embodiment, the passage is located in the front wall of the flange. A recess 102 is provided in the front wall 104 which defines the passage 106. Baffles 108 are provided in the recess to ensure that the coolant follows a circular path as illustrated by the arrows 110 in FIG. 12.

The method and apparatus of the invention provide an effective method of heat sinking during the welding operation to reduce or prevent damage to heat sensitive materials, such as liners and coatings. This advantage permits the use of welding joints, which may be preferred over bolted or clamped flange joints in many end uses, for example petroleum and water pipelines, chemical process industries, petroleum refineries, public works projects, in which the pipes may be made of various grades of steel or iron. The ability to provide a fully welded lined pipe which is afforded by the present invention enables users to enjoy the safety and security advantages of welded joints together with the corrosion resistance of fully lined or coated pipe.

We claim:

1. A method for welding together at a welding location, a pair of metal pipe sections each having a flange at the end thereof, said sections having heat sensitive material juxtaposed to, in contact with or bonded to the interior thereof, said method comprising the steps of:
   (a) providing coolant passages, each of said passages being located directly in contact with a respective flange to create a heatسink between the welding location and the heat sensitive material adjacent to a respective one of said flanges in proximity to said heat sensitive material for heat exchange therewith;
   (b) bringing said flanges into a welding position and passing coolant through said passages;
   (c) welding together said flanges at said welding location; and
   (d) continuing to pass coolant through said passages until the resultant welded flanges have cooled.

2. The method of claim 1 wherein the passages are located within respective flanges.

3. The method of claim 2 wherein the flanges each have a recessed annular portion in the rear face thereof and wherein a cover plate is sealably locatable over each recessed portion, each of said passages being defined by the walls of a respective recessed portion and plate.

4. The method of claim 2 wherein the flanges each have a recessed annular portion in the front face thereof, the recessed portions defining said coolant passages, and wherein said portions are aligned when said flanges are in said welding position to provide a single heat exchange chamber.

5. The method of claim 1 wherein the coolant passages are each located behind respective rear walls of the flanges.

6. The method of claim 5 wherein the coolant passages each have borders including at least a portion of said respective rear walls.

7. The method of claim 6 wherein the passages each have borders including a portion of respective external walls of the pipe sections adjacent to respective flanges.

8. The method of claim 5 wherein the passages each comprise a container adapted to fit around the pipe sections.

9. The method of claim 8 wherein the passages each comprise a pair of coolant passageways, each of said passageways being defined by a respective container adapted to fit around a portion of said pipe, the containers being attachable to one another to encircle the pipe section.

10. The method of claim 1 wherein said passages are removable from said pipe sections and said method includes as its final step the step of removing said passages from said pipe sections.

11. The method of claim 1 wherein the passages extend at least to a region closer to the region of the flange to be welded than the greatest extent of the heat sensitive material.

12. The method of claim 1 wherein said passages are provided with baffles to direct flow through said passages along a circuitous path.

13. The method of claim 1 wherein the coolant passages are permanently attached to respective pipe sections.

14. The method of claim 13 wherein said passages are attached to respective pipe sections by welding.

15. A pipe assembly comprising:
(a) a pipe section having a heat sensitive material juxtaposed to, in contact with or bonded to the interior thereof and having a flange on an end thereof said flange being weldable at a welding location to a similar flange; and
(b) a coolant passage locatable directly in contact with a respective flange to create a heat sink between the welding location and the heat sensitive material, said coolant passage having an inlet for introducing coolant therein and an outlet for exhausting coolant therefrom.

16. The pipe assembly of claim 15 further comprising means for removably attaching said coolant passage to said flange and pipe section.

17. The pipe assembly of claim 15 wherein the coolant passage is located within the flange.

18. The pipe assembly of claim 17 wherein the flange has a recessed annular portion on the rear face thereof and wherein a plate is sealably locatable over said portion, said passage being defined by the walls of said portion and by said plate.

19. The pipe assembly of claim 17 wherein the flange has a recessed annular portion on the front face thereof, said portion defining the coolant passage.

20. The pipe assembly of claim 15 wherein the coolant passage is located behind a rear wall of the flange.

21. The pipe assembly of claim 20 wherein the coolant passage has a border including at least a portion of the rear wall of the flange.

22. The pipe assembly of claim 21 wherein the coolant passage has a border including a portion of the external wall of the pipe section adjacent to said flange.

23. The pipe assembly of claim 20 wherein said coolant passage comprises a container adapted to fit around the pipe section.

24. The pipe assembly of claim 23 wherein the passage comprises a pair of coolant passageways, each of said passageways being defined by a respective container adapted to fit around a portion of said pipe section, the containers being attachable to one another to encircle the pipe section.

25. The pipe assembly of claim 15 wherein said passage is provided with baffles to direct flow through said passage along a circuitous path.

26. The pipe assembly of claim 15 wherein the passage extends at least to a region closer to the region of the flange to be welded than the greatest extent of the heat sensitive material.

27. An apparatus for welding at a welding location, a joint of a metal pipe section, said joint having a flange thereon, said section having a heat-sensitive material juxtaposed to, in contact with or bonded to the interior of said pipe section, said apparatus comprising:
(a) a coolant passage locatable directly in contact with a respective flange to create a heat sink between the welding location and the heat sensitive material, said coolant passage having an inlet for introducing coolant therein and an outlet for exhausting coolant therefrom;
(b) means for directing coolant fluid into said passage for cooling said flange; and
(c) means for exhausting said coolant fluid from said passage.

28. A flange assembly for use in a flange-type joint of a metal pipe section, said pipe section having a heat-sensitive material juxtaposed to, in contact with or bonded to the internal walls of said pipe section, said flange assembly comprising:
(a) a flange portion said flange portion being weldable at a welding location to a similar flange; and
(b) a coolant passage locatable directly in contact with a respective flange to create a heat sink between the welding location and the heat sensitive material, said coolant passage having an inlet for introducing coolant therein and an outlet for exhausting coolant therefrom.

29. A pipe assembly comprising:
(a) a metal pipe section having a heat sensitive material juxtaposed to, in contact with or bonded to the interior thereof and having a flange on an end thereof said flange being weldable at a welding location to similar flange; and
(b) a collar adapted to be located at the rear face of said flange to define a coolant passage including a portion of the rear of said flange to create a heat sink between the welding location and the heat sensitive material, coolant being flowable through said passage to cool said flange in the region of said material.

30. A pipe assembly comprising:

(a) a metal pipe section having a heat sensitive material juxtaposed to, in contact with or bonded to the interior thereof and having a flange on an end thereof; and (b) a container adapted to be located at the rear face of said flange, said container defining a coolant passage therein and having an inlet and an outlet for the introduction and withdrawal of coolant respectively, coolant being flowable through said passage to cool said flange in the region of said material.

31. A pipe assembly comprising:

(a) a metal pipe section having a heat sensitive material juxtaposed to, in contact with or bonded to the interior thereof and having a flange on an end thereof; and (b) a coolant passage defined by a recess located at the rear face of said flange and by a cover plate overlying said recess, said plate having an inlet and an outlet for the introduction and withdrawal of coolant respectively, coolant being flowable through said passage to cool said flange in the region of said material.

32. A pipe assembly comprising:

(a) a metal pipe section having a heat sensitive material juxtaposed to, in contact with or bonded to the interior thereof and having a flange on an end thereof; and (b) a coolant passage defined by a recess located at the front face of said flange, said recess having an inlet and an outlet for the introduction and withdrawal of coolant respectively.

* * * * *

UNITED STATES PATENT OFFICE
CERTIFICATE OF CORRECTION

PATENT NO. : 4,838,477
DATED : June 13, 1989
INVENTOR(S) : Max J. Roach and Jack C. Taylor It is certified that error appears in the above-identified patent and that said Letters Patent is hereby corrected as shown below:

Title page of the patent item [73] should read: Assignee: Du Pont Canada Inc.; Mississauga, Canada; and Longview Sales and Marketing Company, Longview, Texas Signed and Sealed this Sixteenth Day of July, 1991

Attest:

HARRY F. MANBECK, JR.

Attesting Officer

Commissioner of Patents and Trademarks